(12) United States Patent
Rogers et al.

(10) Patent No.: US 9,357,436 B2
(45) Date of Patent: May 31, 2016

(54) METHOD FOR TRANSMITTING STREAMING MEDIA CONTENT TO WIRELESS SUBSCRIBER STATIONS USING PACKET HEADER SUPPRESSION

(71) Applicant: Clearwire IP Holdings LLC, Bellevue, WA (US)

(72) Inventors: Frederick C. Rogers, Olathe, KS (US); Lyle T. Bertz, Lee's Summit, MO (US); Mark A. Lipford, Leawood, KS (US); Manish Mangal, Overland Park, KS (US)

(73) Assignee: Clearwire IP Holdings LLC, Bellevue, WA (US)

(*) Notice: Subject to any disclaimer, the term of this patent is extended or adjusted under 35 U.S.C. 154(b) by 128 days.

(21) Appl. No.: 13/919,453

(22) Filed: Jun. 17, 2013

(65) Prior Publication Data

US 2013/0279415 A1    Oct. 24, 2013

Related U.S. Application Data

(62) Division of application No. 11/876,949, filed on Oct. 23, 2007, now Pat. No. 8,478,331.

(51) Int. Cl.
*H04W 28/06* (2009.01)
*H04W 88/02* (2009.01)
*H04N 21/2381* (2011.01)
(Continued)

(52) U.S. Cl.
CPC ......... *H04W 28/065* (2013.01); *H04N 21/2381* (2013.01); *H04N 21/6131* (2013.01); *H04N 21/6405* (2013.01); *H04N 21/64322* (2013.01); *H04W 88/02* (2013.01)

(58) Field of Classification Search
CPC ......... H04L 69/00; H04L 69/04; H04L 69/22; H04W 28/00; H04W 28/06; H04W 28/065; H04W 88/02
USPC ........ 370/312, 389, 447, 328, 392; 455/414.3
See application file for complete search history.

(56) References Cited

U.S. PATENT DOCUMENTS 5,825,759 A   10/1998   Liu
6,842,621 B2   1/2005   Labun et al.
(Continued)

OTHER PUBLICATIONS

Schulzrinne, et al., "Real Time Streaming Protocol (RTSP)", Request for Comments 2326, Apr. 1998.
(Continued)

*Primary Examiner* — Kwang B Yao
*Assistant Examiner* — Syed M Bokhari (57) ABSTRACT

A radio access system receives packets from a local source of streaming media content via a local connection and from remote packet sources via a remote network. The radio access system communicates with a subscriber station via an air interface that includes an uplink and a downlink. A packet classifier in the radio access system maps packets having the subscriber station's IP address as destination address to the subscriber station's downlink. The subscriber station communicates with a content controller via the remote network to request selected streaming media content. The content controller instructs the radio access system to convey the selected streaming media content from the local source to the subscriber station. In response, the packet classifier maps the packets containing the selected streaming media content to a downlink (either the original downlink or a new one) for transmission to the subscriber station.

6 Claims, 6 Drawing Sheets

(51) Int. Cl.
*H04N 21/61* (2011.01)
*H04N 21/6405* (2011.01)
*H04N 21/643* (2011.01)

(56) References Cited

U.S. PATENT DOCUMENTS

| | | | |
|---|---|---|---|
| 6,901,049 B1 | 5/2005 | Chapman | |
| 6,987,764 B2 | 1/2006 | Hsu | |
| 6,996,410 B2 | 2/2006 | Bos et al. | |
| 7,099,655 B2 | 8/2006 | Song et al. | |
| 7,110,398 B2 | 9/2006 | Grand et al. | |
| 7,130,314 B2 | 10/2006 | Bunn et al. | |
| 7,302,465 B2 | 11/2007 | Ayres et al. | |
| 7,394,779 B2 | 7/2008 | Seo et al. | |
| 7,397,809 B2 | 7/2008 | Wang | |
| 7,558,587 B2 | 7/2009 | Albal et al. | |
| 7,574,170 B2 | 8/2009 | Jendbro | |
| 7,626,984 B2 | 12/2009 | Napierala | |
| 7,633,904 B2 | 12/2009 | Venkatachalam | |
| 7,653,055 B2 | 1/2010 | Guo et al. | |
| 7,826,789 B2 | 11/2010 | Nord | |
| 7,940,723 B2 | 5/2011 | Ahmadi | |
| 7,969,978 B2 | 6/2011 | Napierala | |
| 8,046,479 B2 | 10/2011 | Einarsson et al. | |
| 8,478,331 B1 | 7/2013 | Rogers et al. | |
| 2003/0012180 A1 | 1/2003 | Donahue et al. | |
| 2003/0026268 A1 | 2/2003 | Navas | |
| 2003/0120817 A1 | 6/2003 | Ott et al. | |
| 2004/0001439 A1 | 1/2004 | Jones | |
| 2004/0031058 A1 | 2/2004 | Reisman | |
| 2004/0077345 A1 | 4/2004 | Turner et al. | |
| 2004/0223465 A1 | 11/2004 | Lee et al. | |
| 2004/0242203 A1 | 12/2004 | Lipsanen et al. | |
| 2004/0259594 A1 | 12/2004 | Choi | |
| 2005/0091689 A1 | 4/2005 | Lee | |
| 2005/0144321 A1 | 6/2005 | Forsberg | |
| 2005/0215279 A1 | 9/2005 | Shim et al. | |
| 2006/0025069 A1 | 2/2006 | Benco et al. | |
| 2006/0120400 A1* | 6/2006 | Fukuoka et al. | 370/447 |
| 2006/0160536 A1 | 7/2006 | Chou | |
| 2006/0193286 A1 | 8/2006 | Naghian et al. | |
| 2006/0251077 A1 | 11/2006 | Chou | |
| 2007/0011503 A1 | 1/2007 | Kitani et al. | |
| 2007/0028002 A1 | 2/2007 | McCanne | |
| 2007/0058628 A1 | 3/2007 | Palnati et al. | |
| 2007/0097205 A1 | 5/2007 | Venkatachalam | |
| 2007/0153829 A1 | 7/2007 | De Juan Huarte et al. | |
| 2007/0165631 A1* | 7/2007 | Horton et al. | 370/389 |
| 2007/0189162 A1 | 8/2007 | Song et al. | |
| 2007/0217430 A1 | 9/2007 | Baird et al. | |
| 2007/0230395 A1 | 10/2007 | Guo et al. | |
| 2007/0250863 A1 | 10/2007 | Ferguson | |
| 2007/0253418 A1 | 11/2007 | Shiri et al. | |
| 2008/0026777 A1 | 1/2008 | van der Gaast et al. | |
| 2008/0037545 A1* | 2/2008 | Lansing | H04L 69/04 370/392 |
| 2008/0039967 A1 | 2/2008 | Sherwood | |
| 2008/0069071 A1 | 3/2008 | Tang | |
| 2008/0107109 A1 | 5/2008 | Michaud | |
| 2008/0137569 A1 | 6/2008 | Sang et al. | |
| 2008/0176510 A1 | 7/2008 | Yuhara et al. | |
| 2008/0280618 A1 | 11/2008 | Gaast et al. | |
| 2008/0304445 A1 | 12/2008 | Chou | |
| 2009/0005020 A1* | 1/2009 | McGowan et al. | 455/414.3 |
| 2009/0005098 A1 | 1/2009 | McGowan et al. | |
| 2009/0029644 A1 | 1/2009 | Sue et al. | |
| 2009/0040970 A1 | 2/2009 | Ahmadi et al. | |
| 2009/0059832 A1* | 3/2009 | Jhamnani et al. | 370/312 |
| 2009/0207840 A1 | 8/2009 | McCanne | |

OTHER PUBLICATIONS

Einarsson, et al., "Multiple Aggregated Control URIs for RTSP", Internet-Draft, Dec. 21, 2006.
Madanapalli, et al., "Transmission of IPv4 Packets over IEEE 802.16's IP Convergence Sublayer", Internet-Draft, May 28, 2007.
Jee, et al., "IP over 802.16 Problem Statement and Goals", Internet-Draft, Aug. 13, 2007.
International Telecommunication Union, "Working Document: IPTV Network Control Aspects", FG IPTV-DOC-0048, Oct. 2006.
Mataga, Peter, "Mobile Broadcast: Beyond Mobile TV", Roundbox, Inc. 2006.
Viasat, Inc., "ArcLight, First Interactive Broadband CDMA VSAT, Now Available from ViaSat", Press Release, Feb. 26, 2003.
Pidutti, Mario, "802.16 Tackles Broadband Wireless QoS Issues", CommsDesign, Dec. 2, 2004.
Wood, Mark C., "An Analysis of the Design and Implementation of QoS over IEEE 802.16", Apr. 23, 2006.
International Telecommunication Union, "Key Technical and Operational Requirements for Access Technologies to Support IP Applications over Mobile Systems", Document 8A/IEEE-2-E, Document 8F/IEEE-1-E, Mar. 8, 2006.
Laine, Philippe et al., "Unlimited Mobile TV for the Mass Market", Strategy White Paper, Alcatel, Feb. 2006.
Alcatel, "The Ultimate Solution for Mass Market Mobile TV", Apr. 2006.
Alcatel, "Unlimited Mobile TV, Mobile TV Everywhere for the Mass Market", 2006.
Crozier, S., Guinand, P., Mazur, B., "Design and Performance of Precompensated Frequency Modulation (PFM) for use with a Quasi-Synchronous CDMA Return Link", Proceedings of the 5th International Mobile Satellite Conference, 1997.
Jana, Rittwik; Jora, Serban, "From IPTV to Mobile TV to IMS-TV?: Implications and Standards for a Network Operator", IPTV Workshop International World Wide Web Conference, Edinburgh, Scotland, UK, May 23, 2006.

* cited by examiner

METHOD FOR TRANSMITTING STREAMING MEDIA CONTENT TO WIRELESS SUBSCRIBER STATIONS USING PACKET HEADER SUPPRESSION

CROSS-REFERENCE TO RELATED APPLICATIONS

This application is a division of U.S. patent application Ser. No. 11/876,949, filed Oct. 23, 2007, which application is incorporated herein by reference.

BACKGROUND

1. Field of the Invention

The present invention relates to telecommunications and, more particularly, to methods and systems for transmitting streaming media content to wireless subscriber stations.

2. Description of Related Art

Cellular wireless networks were developed primarily to provide voice communication services to mobile devices. However, wireless service providers have also begun using their cellular wireless networks to provide other types of services, such as providing streaming media content that can be received by and viewed on subscribing mobile devices. Such streaming media content may include audio and/or video, e.g., music selections, movies, or television programming.

Two general approaches have been proposed for providing streaming media content to mobile devices. In one approach, the mobile devices receive streaming media content from terrestrial or satellite broadcasts. For example, the DVB-H and DVB-SH specifications of the Direct Video Broadcasting Project use this approach. However, these streaming media broadcasts typically use a frequency spectrum that is different from that of the cellular wireless network. Thus, a base station in a cellular wireless network may transmit signals for a voice call in one frequency spectrum, while a separate frequency spectrum may be used to broadcast streaming media content to mobile devices. The use of two separate frequency spectra typically results in the mobile device having two separate radios, one radio for receiving transmission from base stations in the cellular wireless network and another radio for receiving streaming media broadcasts. Thus, this approach may require a more complicated mobile device.

In another approach, the streaming media content is transmitted through the cellular wireless network. Thus, a separate frequency spectrum is not needed to provide streaming media content to mobile devices. Instead, the streaming media content originates from one or more content servers in a core network and is backhauled through the cellular wireless network to the base stations that can then wireless transmit the streaming media content. This means that the resources of the wireless service provider's network are used to provide both voice communication services and streaming media content. An example of this approach is the Multimedia Broadcast Multicast Service (MBMS).

SUMMARY

In a first principal aspect, an exemplary embodiment provides a radio access system. The radio access system comprises: (1) a transceiver system for wirelessly transmitting data to a plurality of subscriber stations via a plurality of wireless links; (2) a control interface for receiving control signals; (3) a plurality of data interfaces for receiving data packets; and (4) a packet classifier for mapping the data packets to the wireless links in accordance with the control signals. The plurality of data interfaces includes a first data interface for receiving first data packets via a first pathway and a second data interface for receiving second data packets via a second pathway.

In a second principal aspect, an exemplary embodiment provides a method for transmitting data to a wireless subscriber station. In accordance with the method, first and second data packets are received. The first data packets comprise first packet headers and first packet payloads. The first packet headers include a first destination address corresponding to the wireless subscriber station. The second data packets comprise second packet headers and second packet payloads. The second packet headers include a second destination address. The first data packets are transmitted to the wireless subscriber device via a base station. A control signal is received. In response to the control signal: (a) a packet header suppression rule is established with the wireless subscriber station, wherein the packet header suppression rule associates a packet header suppression index with the first destination address; (b) header-suppressed data packets are generated by replacing the second packet headers in the second data packets with the packet header suppression index; and (c) the header-suppressed data packets are transmitted to the wireless subscriber station via the base station.

In a third principal aspect, an exemplary embodiment provides a system for conveying content to a subscriber station. The system comprises: (1) a radio access system for wirelessly communicating with the subscriber station; (2) a remote network; (3) a content source for transmitting streaming media content to the radio access system via a local connection, wherein the local connection does not extend through the remote network; and (4) a content controller in communication with the radio access system via the remote network. The content controller is configured to communicate with the subscriber station to establish a streaming media session and to control the radio access system to convey selected streaming media content from the content source to the subscriber station.

DETAILED DESCRIPTION OF EXEMPLARY EMBODIMENTS

1. Overview

The inventors have recognized that the conventional approach of backhauling streaming media content from a remote content source through a wireless service provider's network to a base station for transmission to wireless subscriber stations can consume an inordinately large amount of bandwidth. To address this problem, the inventors propose providing the base station with a local source of streaming media content. The local content source may continually transmit packets containing streaming media content to the base station via a local connection. The streaming media content may include, for example, video, audio, audio/video, and/or other types of media content. Moreover, the streaming media content may comprise a plurality of streams of media content. For example, the streaming media content may comprise multiple "channels" of video content.

When a subscriber station requests selected streaming media content, the base station may identify the packets containing the selected streaming media content that the base station is already receiving from the local content source and wirelessly transmit the packets to the subscriber station. In this way, the consumption of bandwidth that would be caused by streaming packets from a remote content source over an extended pathway through the wireless service provider's network can beneficially be avoided.

Although the content source may be local to the base station, the content controller that controls the provision of streaming media content to subscriber stations may still be located remotely. For example, a subscriber station may communicate with a content controller via a remote network to request selected streaming media content. If the request is accepted, the content controller may instruct the base station to convey the selected streaming media content from the local content source to the subscriber station. In this way, the pathway traversed by the packets used to establish the streaming media session may extend through the remote network, while the pathway traversed by the packets containing the actual streaming media content does not extend through the remote network.

In an exemplary embodiment, the base station uses a version of the IEEE 802.16 ("WiMAX") family of standards. In accordance with this approach, a packet classifier in the base station maps packets to downlink transport connections for transmission to subscriber stations. The mapping may be based on information contained in the packet headers, such as source IP address and/or destination IP address. Thus, when a subscriber station is engaged in packet communication (e.g., with an endpoint via the remote network), the packet classifier may map the packets from the remote packet source to the subscriber station's downlink transport connection based on the appearance of the subscriber station's IP address in the destination address field of the packet headers.

The endpoint could be, for example, a content controller that the subscriber station communicates with in order to establish a streaming media session. For example, the subscriber station may request selected streaming media content to be conveyed in a streaming media session. If the request is accepted, the content controller may send the base station a control signal that instructs the base station to convey the selected streaming media content from the local content source to the subscriber station. More particularly, the control signal may cause the base station to change the mapping used by the packet classifier, so that the packet classifier now maps packets containing the selected streaming media content to a downlink transport connection for transmission to the subscriber station. The downlink transport connection used for the streaming media content could be either the original downlink transport connection used for communications from the content controller or a new downlink transport connection.

In addition to the new mapping, the packet classifier may apply packet header suppression (PHS) to the packets containing the selected streaming media content. The PHS approach may be desirable when the packets containing the selected streaming media content have packet headers that would not be recognized by the streaming media application in the subscriber station. For example, the destination address field in the packet headers may identify the base station's IP address rather than the subscriber station's IP address. The base station can overcome this difficulty by establishing a packet header suppression rule with the subscriber station, wherein the packet header suppression rule associates the packet header parameters expected by subscriber station's media application with a packet header suppression index. The packet header parameters for the packet header suppression rule may be supplied by the control signal from the content controller, as some or all of the parameters may have been established during the communication with the subscriber station to set up the streaming media session. When the packet classifier maps the packets containing the selected streaming media content to the subscriber station's transport connection, the packet classifier may also replace the packet headers with the packet header suppression index in accordance with the packet header suppression rule. As a result, the base station may transmit header-suppressed packets to the subscriber station. The subscriber station may then reconstruct the packet headers in accordance with the packet header suppression rule so that the subscriber station's media application can process the packets appropriately.

In an exemplary embodiment, the local source of streaming media content comprises a digital satellite receiver. The satellite receiver may receive via satellite streaming media content in a plurality of channels and output the streaming media content in a digital form, such as MPEG frames. The streaming media content may then be packetized for transmission to the base station. For example, each packet may include a payload that contains a portion of the media content and a packet header that specifies a source address (e.g., an IP address of the local source) and a destination address (e.g., an IP address of the base station).

To facilitate the use of a local source of streaming media content, the base station may be configured with two distinct data interfaces: a data interface that receives data packets from the local source and a data interface that receives data packets from remote sources. Further, the base station may include a control interface for receiving control signals that control how the packet classifier in the base station maps the data packets received on the two data interfaces to transport connections for transmission to subscriber stations.

In this way, the base station can inject streaming media content from a local source into a streaming media session that the subscriber station has established by communicating with a remote content controller. More generally, the base station can switch between conveying packets from a remote source to the subscriber station and conveying packets from a local source to the subscriber station. By using a local source for streaming media content, a wireless service provider can beneficially provide streaming media content services without consuming bandwidth that the wireless service provider uses for other types of communication services, such as VoIP communication and wireless Web browsing.

2. Exemplary Network Architecture

Figure 1:
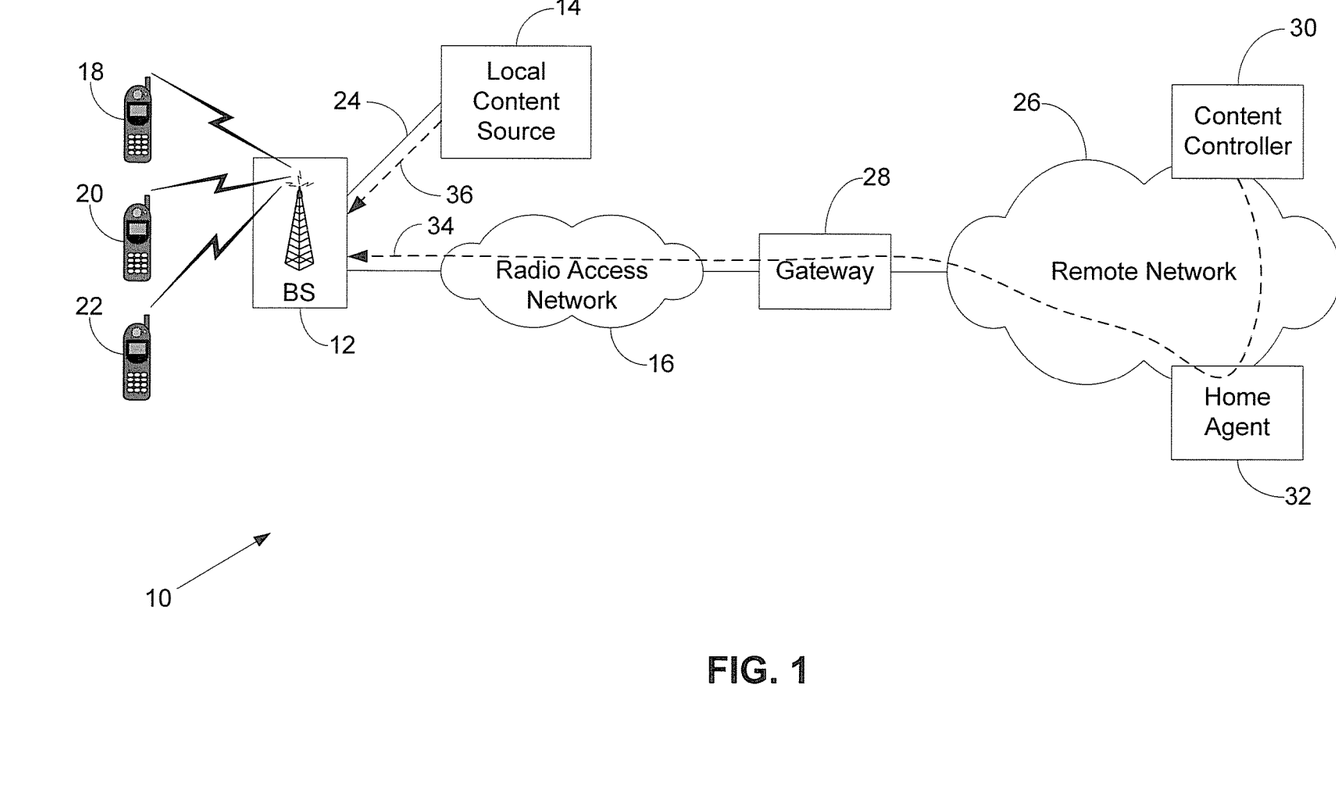
FIG. 1 is a block diagram of a telecommunications network, in accordance with an exemplary embodiment.

FIG. 1 illustrates an exemplary telecommunications network 10. Network 10 includes a base station 12 that is communicatively coupled to a local content source 14 and to a radio access network 16. Base station 12 is able to communicate with a plurality of subscriber stations, exemplified in FIG. 1 by subscriber stations 18, 20, and 22, via an an air interface. The subscriber stations may include mobile subscriber stations, such as wireless telephones, wireless personal digital assistants (PDAs), and wirelessly-equipped laptop computers. The subscriber stations may also include fixed wireless stations. The air interface communications between base station 12 and subscriber stations 18, 20, and 22 may use protocols such as cdma2000, GSM/GPRS, IEEE 802.16 ("WiMAX"), and/or other wireless communications protocols.

Although FIG. 1 shows radio access network 16 communicatively coupled to only base station, it is to be understood that radio access network 16 could be communicatively coupled to a plurality of base stations. In addition, each base station may include its own local content source, or a local content source may be used by multiple base stations.

Subscriber stations 18, 20, and 22 may communicate with base station 12 in order to send and/or receive data packets. The data packets may carry signaling that is used to establish, control, and/or tear down communication sessions. The data packets may also carry the voice, video, Web content, or other content that is exchanged during communication sessions. Each data packet may include a packet header and a packet payload. The packet header may include various parameters that facilitate the routing and proper handling of the packet, e.g., in accordance with the Internet Protocol (IP), User Datagram Protocol (UDP), and/or Transmission Control Protocol (TCP). Thus, the packet header may include an IP address that corresponds to the source address of the packet, an IP address that corresponds to the destination address of the packet, as well as source and destination port numbers. The packet payload corresponds to the underlying data in the packet. The underlying data may comprise, for example, signaling used to set up a communication session or content (e.g., as voice, video, or Web content) to be provided in a communication session.

The data packets that subscriber stations 18, 20, and 22 receive may include packets that base station 12 receives from local content source 14 via a local connection 24 and/or packets that base station 12 receives from a remote source via radio access network 16. In this regard, radio access network 16 may be communicatively coupled to a remote network 26 via a gateway 28. In the case that base station 12 communicates using an IEEE 802.16 protocol, gateway 28 may correspond to an access service network gateway (ASN-GW), and radio access network 16 may correspond to an access service network (ASN). In the case that base station 12 communicates using a cdma2000 protocol, gateway 28 may correspond to a packet data serving node (PDSN), and radio access network 16 may include a base station controller (BSC) and a packet control function (PCF).

Subscriber stations 18, 20, and 22 may communicate with various types of endpoints via remote network 26. Such endpoints may include other subscriber stations (e.g., subscriber stations served by other base stations), Web servers, gaming servers, e-mail servers, other content servers, and content controllers. For purposes of illustration, FIG. 1 shows a content controller 30 connected to remote network 26. However, it is to be understood that other types of endpoints could also be connected to remote network 26.

For communications via remote network 26, subscriber stations 18, 20, and 22 could use either Simple IP or Mobile IP. When a subscriber station uses Mobile IP, then the subscriber station is associated with a home agent in remote network 26, exemplified in FIG. 1 by home agent 32. Moreover, in the Mobile IP approach, packets transmitted to the subscriber station are routed through the subscriber station's home agent. Thus, when a subscriber station (e.g., subscriber station 18) uses home agent 32 for Mobile IP and receives packets from content controller 30, the packets reach base station 12 via a pathway 34 that extends through remote network 26, home agent 32, gateway 28, and radio access network 16, as shown in FIG. 1.

In contrast, local connection 24 preferably does not extend through remote network 26 and does not extend through gateway 28 (but might extend through radio access network). Thus, packets from local content source 14 may reach base station 12 via a pathway 36 that does not extend through radio access network 26 and does not extend through gateway 28, as shown in FIG. 1. In this way, packets from local content source 14 do not consume the bandwidths of remote network 26, gateway 28, or the backhaul connections between gateway 28 and networks 16 and 26.

Figure 2:
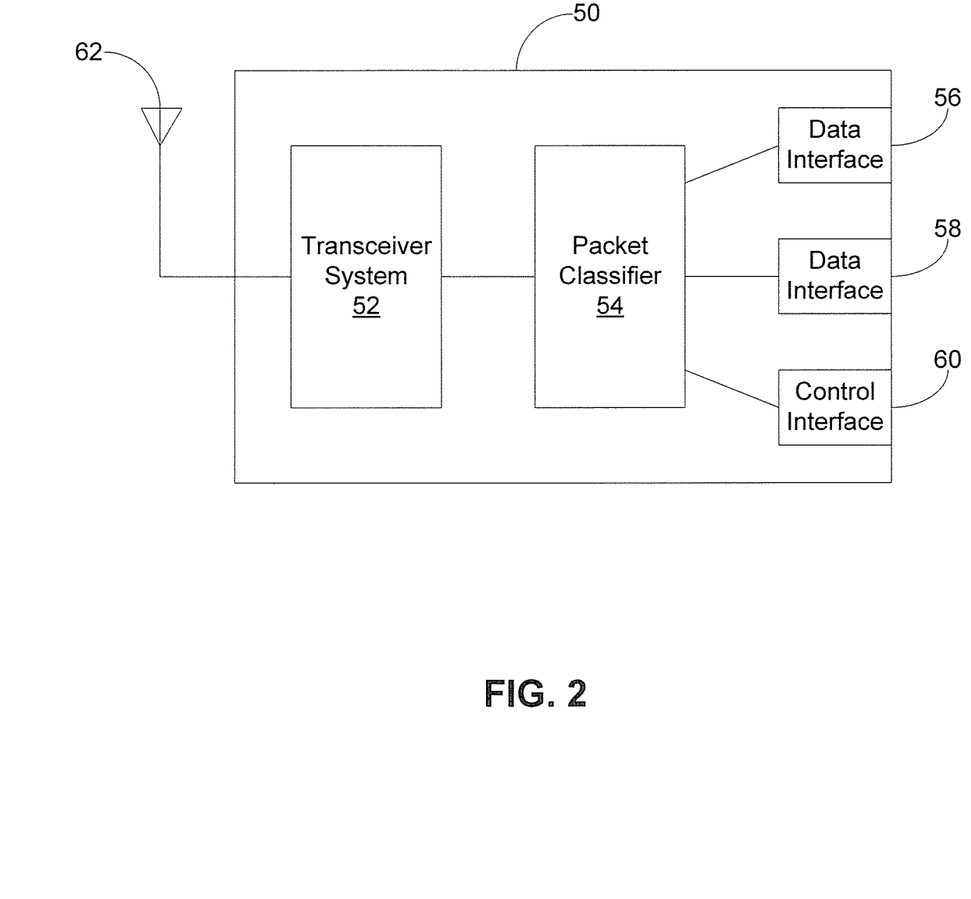
FIG. 2 is a block diagram of a radio access system, in accordance with an exemplary embodiment.

FIG. 2 illustrates an exemplary configuration for a radio access system 50. Radio access system 50 may correspond to base station 12 shown in FIG. 1, e.g., in the case that base station 12 uses a version of the IEEE 802.16 family of standards. Alternatively, radio access system 50 may correspond to base station 12 in combination with one or more elements in radio access network 16 and/or gateway 28. For example, if base station 12 uses cdma2000, then radio access system 50 may correspond to base station 12 in combination with a PCF in radio access network 16 or in combination with a PCF and with gateway 28 functioning as a PDSN. For purposes of illustration, radio access system 50 is described below with reference to 802.16. It is to be understood, however, that other protocols could be used.

With reference to FIG. 2, radio access system 50 includes a transceiver system 52 communicatively coupled to a packet classifier 54, which, in turn, is communicatively coupled to data interfaces 56 and 58 and to control interface 60. Transceiver system 52 wirelessly communicates with one or more subscriber stations, such as subscriber stations 18, 20, and 22, via one or more antennas, exemplified in FIG. 2 by antenna 62.

Transceiver system 52 communicates with subscriber stations via a plurality of wireless links. In the 802.16 case, these wireless links include downlink transport connections for transmitting data to subscriber stations and uplink transport connections for receiving data from subscriber stations. The 802.16 transport connections are MAC layer connections between the base station and one or more subscriber stations. Each 802.16 transport connection is uniquely identified by a 16-bit connection identifier (CID) and is associated with a particular set of quality-of-service (QoS) attributes. An uplink transport connection is used by a particular subscriber station to transmit data to the base station. A downlink transport connection can be either unicast (the base station transmits data to one particular subscriber station), multicast (the base station transmits data to multiple subscriber stations), or broadcast (the base station transmits data to all subscriber stations being served by the base station).

Packet classifier 54 is part of a convergence sublayer in the 802.16 MAC layer and is responsible for assigning service data units received from a higher level application, such as IP, to a downlink transport connection. Thus, packet classifier 54 maps IP packets to the appropriate downlink transport connections for transmission to subscriber stations by transceiver system 52. To perform this mapping, packet classifier 54 applies a classifier rule. For example, a classifier rule may map an IP packet to a particular downlink transport connection based on one or more parameters contained in the packet header, such as source IP address, destination IP address, source port number and/or destination port number. In this way, when a subscriber station has an IP address, packets that identify the subscriber station's IP address as destination address may be mapped to the subscriber station's downlink transport connection. It is to be understood, however, that a classifier rule may take into account parameters other than the foregoing. In addition to applying a classifier rule, packet classifier 54 may apply a packet header suppression rule, as described in more detail below.

The IP packets that packet classifier 54 maps to transport connections may be received on either data interface 56 or data interface 58. In an exemplary embodiment, data interface 56 is connected to local connection 24, so as to receive data packets transmitted by local content source 14, and data interface 58 is connected to radio access network 16, so as to receive data packets transmitted by endpoints via remote network 26. Packets from remote network endpoints may be routed to home agent 32, which may then forward the packets to gateway 28. Gateway 28 may then use a Layer 2 tunnel to transmit the packets through radio access network 16.

Radio access system 50 may also receive control signals on control interface 60, which may be connected to radio access network 16. Such control signals may come from gateway 28 or from a remote network endpoint such as content controller 30 via gateway 28. The control signals may be used to change the classifier rules and/or packet header suppression rules applied by packet classifier 54. In this way, control signals received on control interface 60 may control how packet classifier 54 maps packets to downlink transport connections for transmission to subscriber stations.

3. Exemplary Methods for Providing Streaming Media Content

Figure 3:
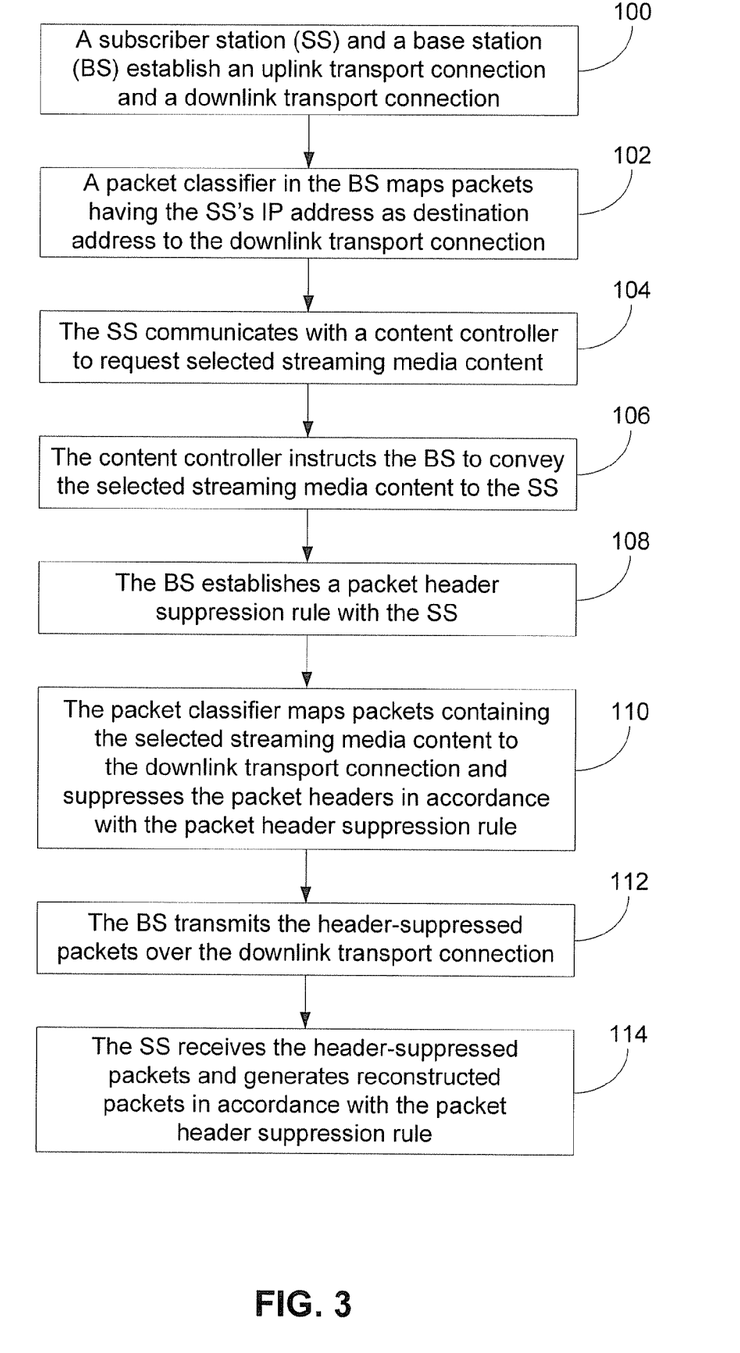
FIG. 3 is a flow chart illustrating a method of transmitting streaming media content to a subscriber station, in accordance with an exemplary embodiment.

FIG. 3 is a flow chart illustrating an exemplary method for providing streaming media content to a subscriber station. This example assumes the network architecture shown in FIG. 1 and assumes that the base station uses IEEE 802.16 protocols. It is to be understood, however, that other network architectures and/or communication protocols could be used.

The method may begin when a subscriber station (e.g., subscriber station 18) and a base station (e.g., base station 12) establish an uplink transport connection and a downlink transport connection, as indicated by block 100. In this example, the uplink and downlink transport connections are both unicast. The uplink and downlink transport connections may be established after the base station and subscriber station exchange a series of dynamic service addition (DSA) messages. For example, the subscriber station may request the transport connections by transmitting a DSA request (DSA-REQ) message. The base station may accept the request and respond with a DSA response (DSA-RSP) message to the subscriber station. The subscriber station may then send a DSA acknowledgement (DSA-ACK) message back the base station.

The base station may use information contained in the DSA messages (such as the subscriber station's IP address) to set up a classifier rule for mapping IP packets to the subscriber station's downlink transport connection. Thus, when the subscriber station uses the uplink transport connection to send data packets to an endpoint, which then respond with data packets, a packet classifier in the base station is able to map the data packets that are intended for the subscriber station to the subscriber station's downlink transport connection. For example, the packet classifier may map packets having the subscriber station's IP address as destination address to the subscriber station's downlink transport connection, as indicated by block 102.

The subscriber station may use the uplink and downlink transport connections to communicate with a content controller (e.g., content controller 30) to request selected streaming media content, as indicated by block 104. The communications could, for example, make use of the Session Initiation Protocol (SIP) and Session Description Protocol (SDP). A recent version of SIP is described in J. Rosenberg et al., "SIP: Session Initiation Protocol," Request for Comments 3261, June 2002, which is incorporated herein by reference. A recent version of SDP is described in M. Handley et al., "SDP: Session Description Protocol," Request for Comments 4566, July 2006, which is incorporated herein by reference.

For example, to request streaming media content, the subscriber station may send a SIP INVITE message to the content controller to begin the process of establishing a streaming media session. If the content controller accepts the request, the content controller may respond with a SIP 200 OK message. These SIP messages may include SDP descriptions of the streaming media content being requested and the transport parameters to be used for delivering the streaming media content. The transport parameters may include, for example, the IP address and port number that will receive the content. A media application in the subscriber station may use these transport parameters to receive and process the streaming media content in an appropriate manner.

When the SIP messaging to establish the streaming media session has been successfully completed, the content controller may instruct the base station to convey the selected streaming media content to the subscriber station, as indicated by block 106. To do this, the content controller may send one or more control signals to the base station. The control signals may identify which "channel" of streaming media content the base station is to send to the subscriber station and may specify that the base station is to use its local source of streaming media content (e.g., local content source 14). The control signals may also identify the transport parameters, such as IP address and port number for receiving the streaming media content, that were negotiated in block 104.

The base station may respond to the control signals by establishing a packet header suppression rule with the subscriber station, as indicated by block 108. The packet header suppression rule associates a packet header suppression index with one or more packet header parameters, such as source IP address, source port number, destination IP address, and/or destination port number. More particularly, the packet header suppression rule associates the packet header suppression index with the transport parameters that the subscriber station negotiated in block 104 for receiving the streaming media content. In this way, the packet header suppression index may be associated with the IP address and port number that the subscriber station indicated would be receiving the streaming media content.

The packet classifier may then map the packets (from the local content source) containing the selected streaming media content to the subscriber station's downlink transport connection and suppress the packet headers in accordance with the packet header suppression rule, as indicated by block 110. To suppress the packet headers, the packet classifier may replace the packet headers with the packet header suppression index while leaving the packet payloads unchanged. The base station may then transmit the header-suppressed packets over the subscriber station's downlink transport connection, as indicated by block 112. Although in this example the subscriber station's existing downlink transport connection is used, it is to be understood that a different downlink transport connection (e.g., a multicast transport connection) could be used to transmit the header-suppressed packets to the subscriber station, as described in more detail below.

When the subscriber station receives the header-suppressed packets, the subscriber station generates reconstructed packets in accordance with the packet header suppression rule, as indicated by block 114. To do this, the packet header suppression index may be replaced by the packet header parameters associated with the packet header suppression index. As a result, the reconstructed packets include the original packet payloads transmitted by the local content source but with different packet headers. For example, the packets transmitted by the local content source may identify the base station's IP address as destination address, whereas the reconstructed packets may identify the subscriber station's IP address as destination address. In this way, the process of packet header suppression and reconstruction results in packets that have packet payloads containing the streaming media content selected by the subscriber station and that have packet headers containing the transport parameters that enable the subscriber station's media application to properly receive and process the selected streaming media content.

After the subscriber station begins receiving the selected streaming media content, the subscriber station may control the further provision of streaming media content by communicating with the content controller, e.g., using the Real Time Streaming Protocol (RTSP). The basic version of RTSP is described in H. Schulzrinne et al., "Real Time Streaming Protocol (RTSP)," Request for Comments 2326, April 1998, which is incorporated herein by reference. For example, the subscriber station may request different streaming media content (i.e., change the content "channel" that the subscriber station is receiving) by sending an RTSP PLAY request to the content controller. This approach may be used to change the content channel within the existing RTSP session, e.g., as described in T. Einarsson et al., "Multiple aggregated control URIs for RTSP," Internet Draft, draft-einarsson-mmusic-rtsp-macuri-01, Dec. 21, 2006, which is incorporated herein by reference.

The content controller may control the base station in response to the requests from the subscriber station. For example, when the subscriber station requests a new content channel, the content controller may instruct the base station to convey the streaming media content corresponding to the new content channel to the subscriber station. The packet classifier may then change its mapping so that the packets containing the streaming media content for the new content channel are mapped to the subscriber station's current downlink transport connection (or to a different downlink transport connection, e.g., in the case that the current downlink transport connection is a multicast connection that is being viewed by other subscriber stations).

Figure 4:
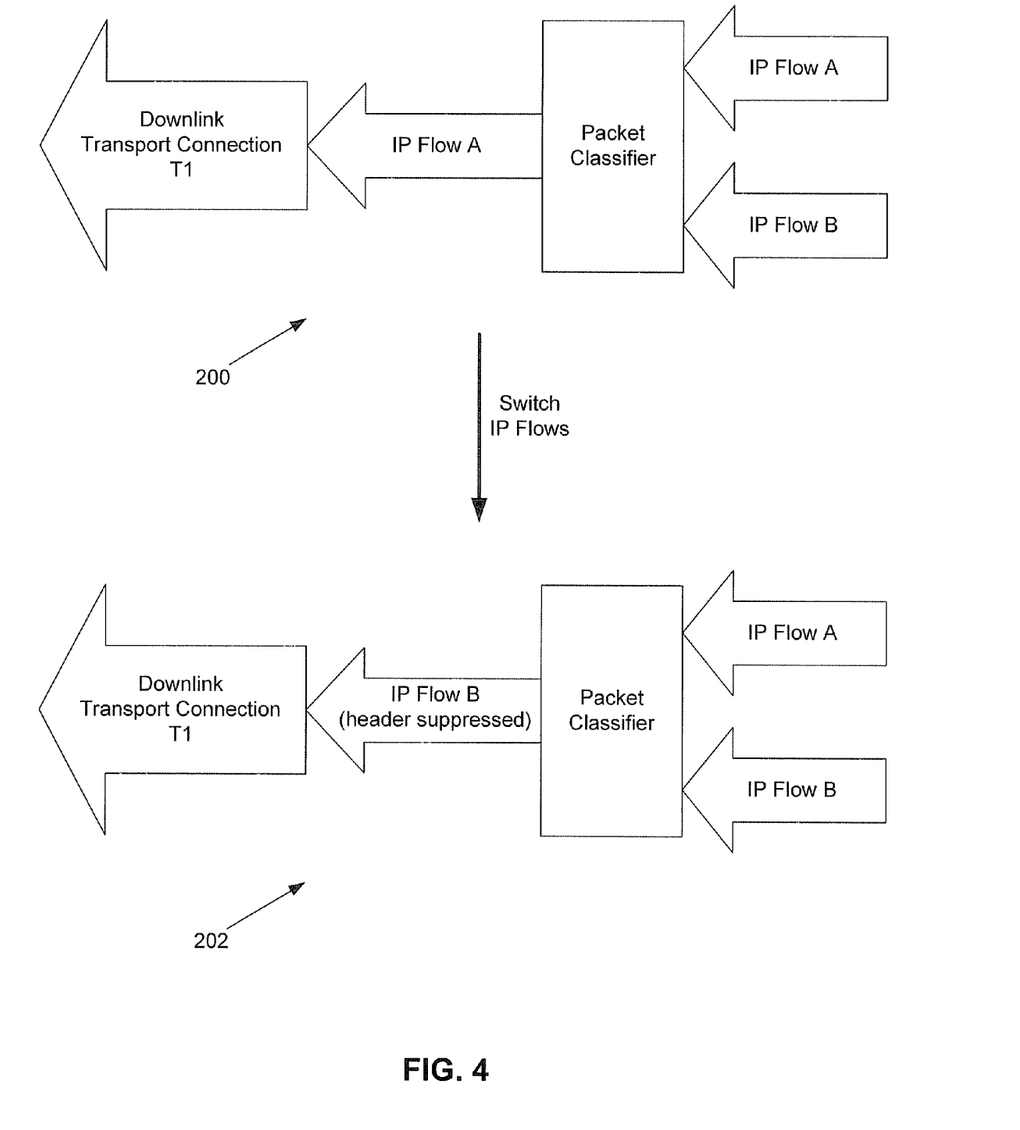
FIG. 4 is a schematic diagram illustrating a method of switching IP packet flows over a transport connection, in accordance with an exemplary embodiment.

The process of changing the mapping used by a packet classifier to convey streaming media content to a subscriber station can be viewed as an example of switching IP packet flows over a transport connection. FIG. 4 schematically illustrates an example of switching from an IP Flow A to an IP Flow B over a downlink transport connection T1. Initially, the packet classifier receives data packets in IP Flow A and data packets in IP Flow B but maps only the data packets in IP Flow A to transport connection T1, as indicated by configuration 200. The data packets in IP Flow A may originate from a remote packet source, such as content controller 30, whereas the data packets in IP Flow B may originate from a local packet source, such as local content source 14.

At some point, the packet classifier changes the mapping it uses, thereby switching IP flows. The change may occur in response to a control signal, such as a control signal from content controller 30. As a result of the change, the packet classifier maps the data packets in IP Flow B, instead of the data packets in IP Flow A, to transport connection T1, as indicated by configuration 202.

In addition, the packet classifier may apply packet header suppression to the IP Flow B packets mapped to transport connection T1. By appropriate choice of packet header suppression rule, this approach can be used to make the data packets in IP Flow B appear to originate from the same source as the data packets in IP Flow A (e.g., by associating the packet header suppression index with the source address of the IP Flow A packets) and/or to provide the data packets in IP Flow B with a destination address that would be recognized by the subscriber station (e.g., by associating the packet header suppression index with the subscriber station's IP address). In this way, data from IP Flow B can be injected into an existing downlink transport connection.

Thereafter, the base station may silently discard any data packets that it receives in IP Flow A, e.g., in accordance with a deny rule from content controller 30. Alternatively, the packet classifier may continue to map data packets in IP Flow A to transport connection T1, so that the base station transmits any IP Flow A packets to the subscriber station along with the IP Flow B packets.

FIG. 4 illustrates an example in which the same downlink transport connection is used for both IP Flow A and IP Flow B. That approach can be used when the downlink transport connection has a connection type that is appropriate for IP Flow B. However, when the original downlink transport connection does not have the appropriate connection type, then a new downlink transport connection may be used for IP Flow B. For example, it may be beneficial to switch from a unicast transport connection to a multicast transport connection when a subscriber station (e.g., subscriber station 18) requests a "channel" of streaming media content that is already being received by one or more other subscriber stations (e.g., by subscriber stations 20 and 22). Thus, a unicast transport connection may be appropriate for establishing a streaming media session, but a multicast transport connection may be more appropriate for conveying the actual streaming media content. On the other hand, if the downlink transport connection used for IP Flow A has the appropriate connection type but does not have the QoS attributes appropriate for the streaming media content in IP Flow B, then the QoS attributes may be changed, for example, using Dynamic Service Change (DSC) messages, rather than establishing a new downlink transport connection.

Figure 5:
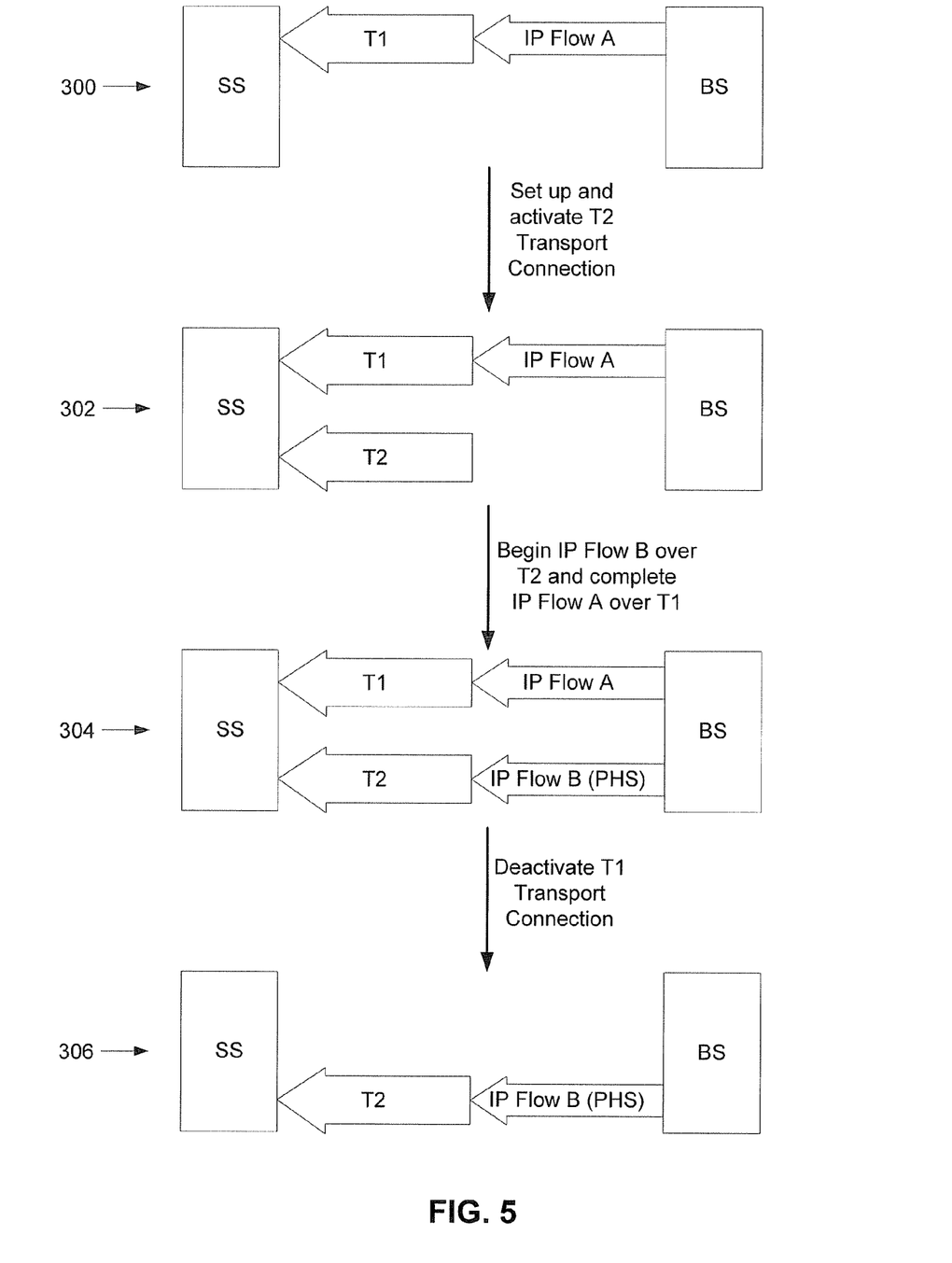
FIG. 5 is a schematic diagram illustrating a method of switching IP packet flows and transport connections, in accordance with an exemplary embodiment.

FIG. 5 illustrates an example in which a new transport connection is used for IP Flow B. The process begins with the base station (BS) transmitting IP Flow A in unicast transport connection T1 to the subscriber station (SS), as indicated by configuration 300. At some point, the base station receives a control signal instructing the base station to convey IP Flow B to the subscriber station. To prepare for transmission of IP Flow B, the base station sets up and activates multicast transport connection T2, as indicated by configuration 302. The base station then establishes a packet header suppression (PHS) rule for transport connection T2 and begins transmitting header-suppressed packets in IP Flow B, in accordance with the PHS rule, over transport connection T2. At the same time, the base station completes the transmission of IP Flow A over transport connection T1, as indicated by configuration 304. When the transmission of IP Flow A has been completed, the base station deactivates transport connection T1. Thus, the base station is left transmitting IP Flow B (using the PHS rule) over transport connection T2 to the subscriber station, as indicated by configuration 306. Because transport connection T2 is multicast, multiple subscriber stations may receive IP Flow B over transport connection T2. However, each subscriber station receiving IP Flow B may apply a different PHS rule, so that different subscriber stations may reconstruct the packets in IP Flow B with different packet headers.

Figure 6:
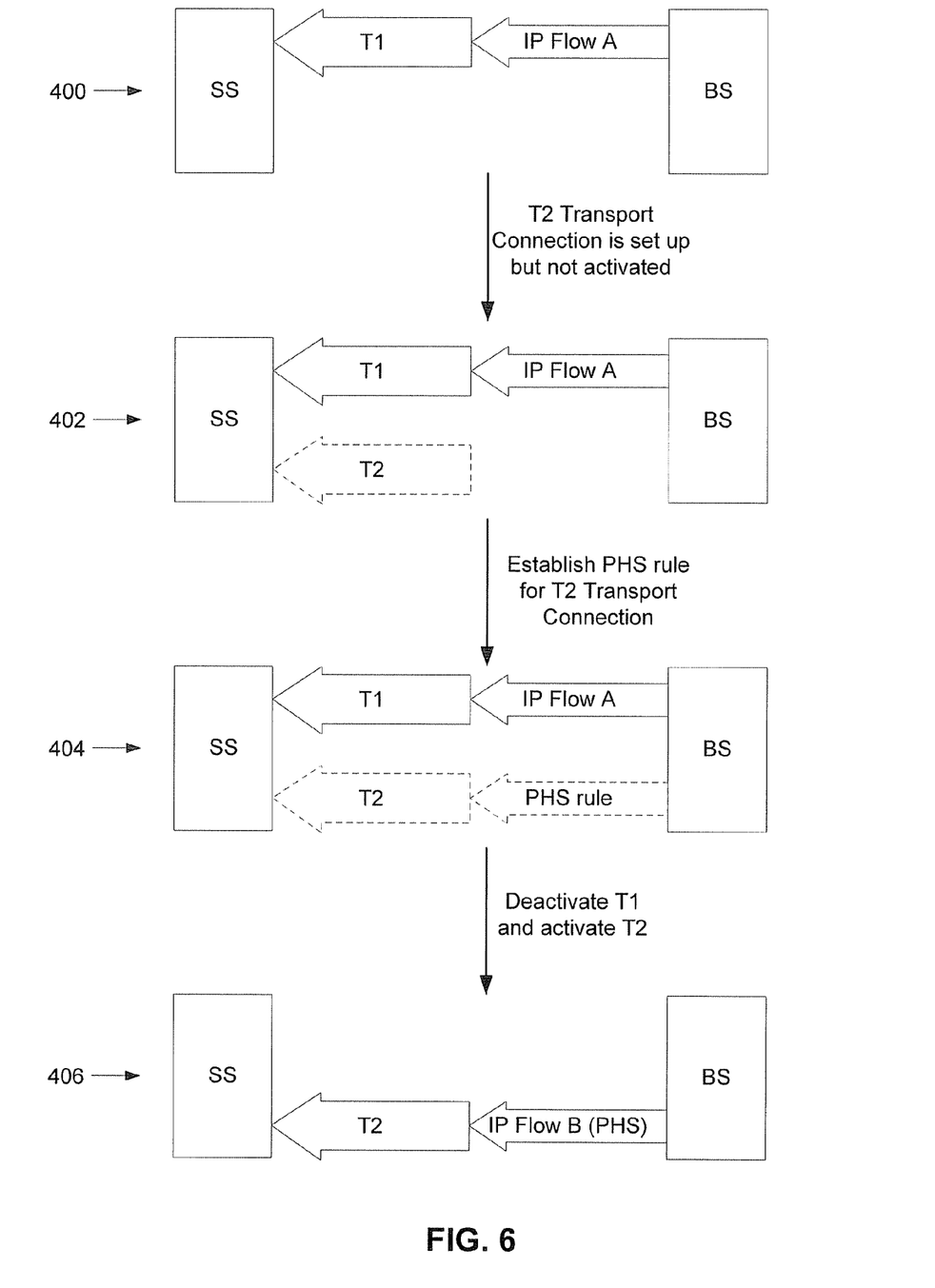
FIG. 6 is a schematic diagram illustrating a method of switching IP packet flows and transport connections, in accordance with an exemplary embodiment.

FIG. 5 illustrates a "make-before-break" approach in which transport connections T1 and T2 are both used until the transmission of IP Flow A has been completed. Alternatively, the simultaneous use of transport connections may be avoided in order to use bandwidth more efficiently. This approach is illustrated in FIG. 6.

The process begins with the base station (BS) transmitting IP Flow A in unicast transport connection T1 to the subscriber station (SS), as indicated by configuration 400. At some point, the base station receives a control signal instructing the base station to convey IP Flow B to the subscriber station. To prepare for the transmission of IP Flow B, the base station sets up, but does not activate, multicast transport connection T2, as indicated by configuration 402. The base station then establishes a packet header suppression (PHS) rule to be used for transmitting IP Flow B over transport connection T2, as indicated by configuration 404. However, the base station waits for the transmission of IP Flow A to be completed before transmitting IP Flow B over transport connection T2. In the interim, the base station may store the IP Flow B packets in a queue until transport connection T2 is activated. When the transmission of IP Flow A has been completed, the base station deactivates transport connection T1 and activates transport connection T2. The base station then begins transmitting IP Flow B (using the PHS rule) over transport connection T2 to the subscriber station, as indicated by configuration 406.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for transmitting data to a wireless subscriber station, said method comprising: receiving first data packets, said first data packets comprising first packet headers and first packet payloads, said first packet headers including a first destination address corresponding to said wireless subscriber station; receiving second data packets containing selected media content, said second data packets comprising second packet headers and second packet payloads, said second packet headers including a second destination address corresponding to a base station; transmitting said first data packets to said wireless subscriber station via said base station; receiving a control signal; in response to said control signal: (a) establishing a packet header suppression rule with said wireless subscriber station, wherein said packet header suppression rule associates a packet header suppression index with said first destination address; (b) a packet classifier mapping said second data packets to a downlink transport connection of said wireless subscriber station and generating header-suppressed data packets by replacing said second packet headers in said second data packets with said packet header suppression index; and (c) transmitting said header-suppressed data packets to said wireless subscriber station via said base station.

2. The method of claim 1, further comprising:
said wireless subscriber station generating reconstructed data packets from said header-suppressed data packets in accordance with said packet header suppression rule, said reconstructed data packets comprising said second packet payloads and reconstructed packet headers, said reconstructed packet header including said first destination address.

3. The method of claim 1, wherein said first packet headers include a first source address and said second packet headers include a second source address, and wherein said packet header suppression rule associates said packet header suppression index with said first source address.

4. The method of claim 1, wherein said control signal specifies a plurality of packet header parameters, said plurality of packet header parameters including said first destination address, and wherein said packet header suppression rule associates said packet header suppression index with said plurality of packet header parameters.

5. The method of claim 1, wherein said first data packets are received from a content controller via a first pathway and said second data packets are received from a local content source via a second pathway.

6. The method of claim 5, wherein said first pathway extends through a home agent associated with said wireless subscriber station and said second pathway does not extend through said home agent.

* * * * *